No. 868,801. PATENTED OCT. 22, 1907.
W. S. OSWALD.
WHEEL HUB.
APPLICATION FILED MAR. 28, 1907.

WITNESSES:

William S. Oswald,
INVENTOR.

By C.A.Snow&Co.
ATTORNEYS

UNITED STATES PATENT OFFICE.

WILLIAM S. OSWALD, OF DIRECT, TEXAS.

WHEEL-HUB.

No. 868,801.

Specification of Letters Patent.

Patented Oct. 22, 1907.

Application filed March 28, 1907. Serial No. 365,043.

*To all whom it may concern:*

Be it known that I, WILLIAM S. OSWALD, a citizen of the United States, residing at Direct, in the county of Lamar and State of Texas, have invented a new and useful Wheel-Hub, of which the following is a specification.

This invention relates to wheel hubs and its object is to provide a roller bearing of novel form designed to reduce friction to the minimum and also disposed to hold the hub against longitudinal displacement upon its spindle.

A still further object is to provide a hub of this character having its bearings as well as the end portions of the spindle concealed therein where they are fully protected from the admission of dust, etc., which might seriously interfere with the rotation of the hub.

With these and other objects in view the invention consists of certain novel features of construction and combinations of parts which will be hereinafter more fully described and pointed out in the claims.

In the accompanying drawings is shown the preferred form of the invention.

Figure 1:
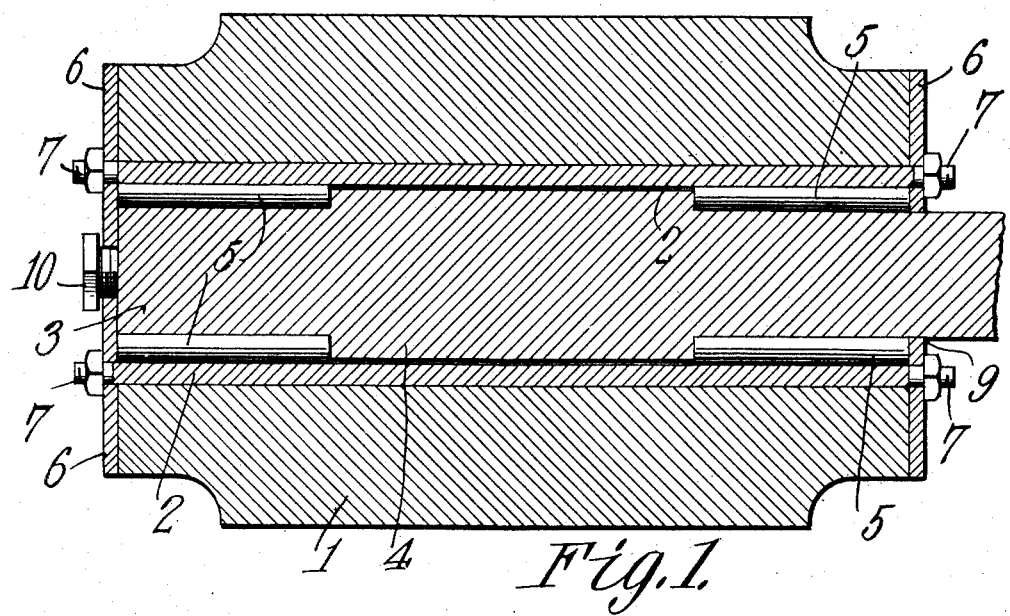
Figures 2, 3:
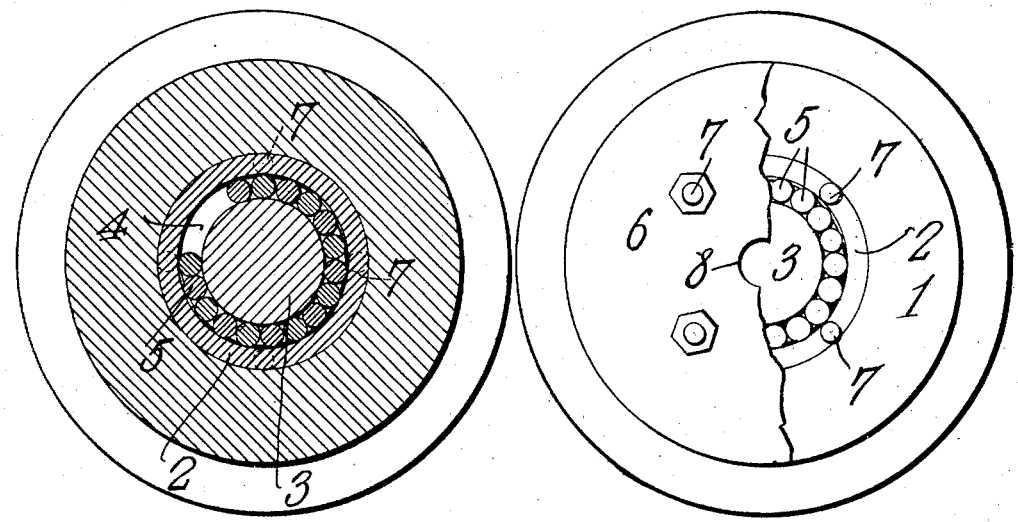

In said drawings: Figure 1 is a longitudinal section through a hub and its spindle constructed in accordance with the present invention; Fig. 2 is an end elevation thereof, a portion of the retaining plate being broken away; and Fig. 3 is a transverse section through one end portion of the hub, some of the rollers of the bearing being removed.

Referring to the figures by characters of reference, 1 is a hub having a metallic box 2 and extending into this box is a spindle 3 formed with an annular collar 4. This collar is so positioned that when the spindle is inserted into the box the collar will assume a position within the central portion of the hub. Friction rollers 5 are interposed between the collar and each end of the hub and are retained in position by end plates 6. These end plates are fastened to the ends of the hub in any preferred manner as by means of bolts 7 extending from the box 2 and the outer plate has an oil opening 8 at the center thereof, the inner end of which is practically closed at all times by the end of spindle 3. The other plate 6 has an opening 9 through which the spindle extends. Collar 4 is supported out of contact with the box by the rollers and as the length of the rollers is substantially equal to the distance between the collar and each of the end plates it is obvious that said rollers will hold the spindle against longitudinal movement by bearing against the end plates. The rollers can be easily lubricated by forcing a lubricant through the opening 8. The two end plates not only constitute end or thrust bearings for the rollers but also act as guards to prevent the admission of dust, etc., between the rollers. It will be seen that with a hub of this construction it is unnecessary to fasten the wheel upon the spindle by means of nuts as heretofore but instead the rollers constituting the bearings coöperate with the end plates for the purpose of retaining the hub in position. Any roller of either series can be conveniently removed simply by detaching the adjoining end plate 6. A hub constructed in the manner herein described is not only durable and effective but will also be found attractive inasmuch as the means for securing the hub against longitudinal displacement is practically concealed. A screw plug 10 is preferably employed for positively closing the opening 8.

What is claimed is:

1. The combination with a hub; of a box therein, bolts integral with and extending from the ends of the box, a spindle mounted to rotate within the box and having an annular collar, retaining plates secured upon the bolts, one of said plates surrounding the spindle and anti-friction devices within the box and interposed between the collar and the retaining plates, said anti-friction devices, collar and plates constituting means to prevent longitudinal movement of the hub upon the spindle.

2. The combination with a hub, a box therein, and bolts extending from and integral with the ends of the box; of retaining plates secured upon the bolts and bearing against the ends of the hub, a spindle revolubly mounted within the box and having a collar thereon, and anti-friction devices within the box and interposed between the collar and retaining plates to hold the hub and spindle against independent longitudinal movement.

In testimony that I claim the foregoing as my own, I have hereto affixed my signature in the presence of two witnesses.

WILLIAM S. OSWALD.

Witnesses:
W. A. HITCHCOCK,
A. BATEMAN.